Oct. 17, 1961     B. M. CHIN ET AL     3,005,139

SERVOSYSTEM LEAD NETWORK

Filed May 19, 1960     2 Sheets-Sheet 1

INVENTORS
BOCK M. CHIN
GERALD L. SULLIVAN
BY
*Irving M. Freedman*
THEIR ATTORNEY

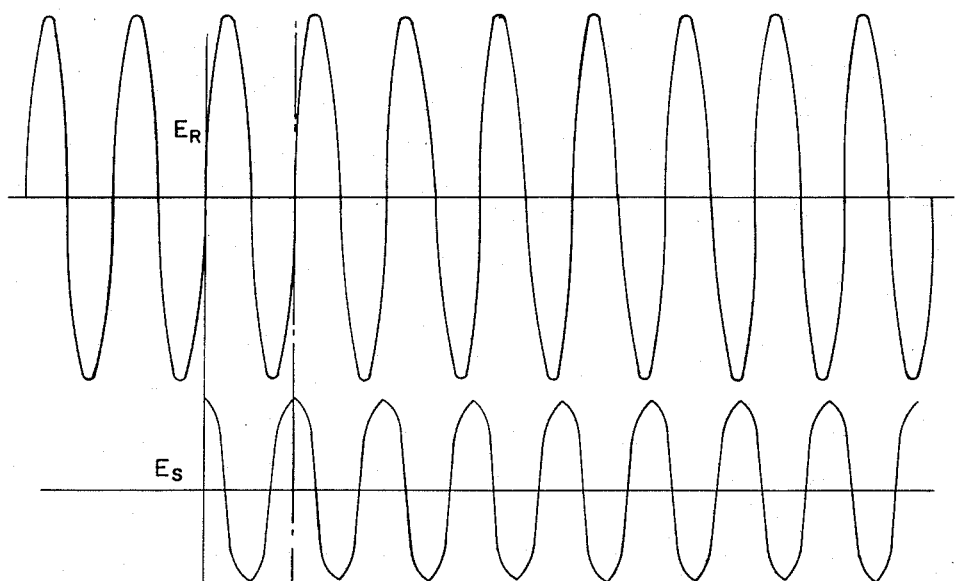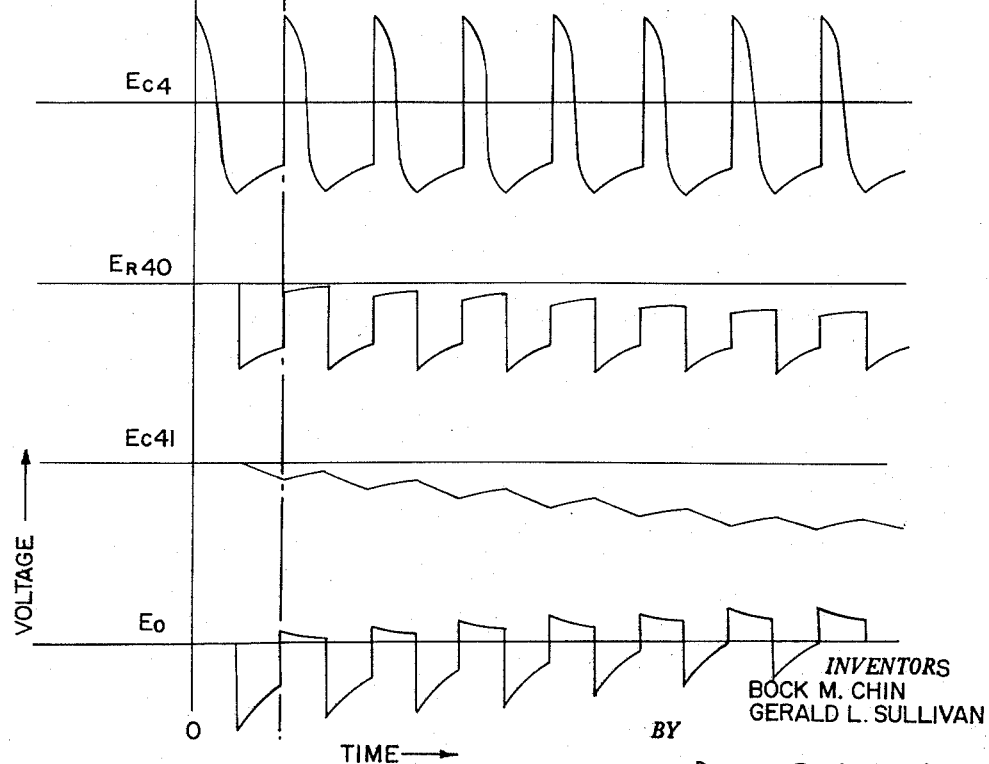

United States Patent Office

3,005,139
Patented Oct. 17, 1961

3,005,139
SERVOSYSTEM LEAD NETWORK
Bock M. Chin, West Peabody, and Gerald L. Sullivan, Rowley, Mass., assignors to General Electric Company, a corporation of New York
Filed May 19, 1960, Ser. No. 30,198
12 Claims. (Cl. 318—448)

This invention relates to a data sampling circuit, and more particularly, to an improved circuit including an A.C. compensation network arrangement suitable for use in servo systems to provide optimum servo lead characteristics.

Lag characteristics created by the servo motor and associated load in a servo system are undesirable and prevent the servo motor and resultant control action from quickly responding to control signal variations. It is known to provide servo system circuits which produce a servo phase lead to compensate for such lag characteristics. In one form of compensating arrangement the input modulated alternating signal is converted to a D.C. signal proportional to the input, and the D.C. is subsequently reconverted to an alternating signal through a modulating arrangement after having been operated upon by a compensating circuit which provides the desired servo phase lead. However, prior art arrangements have been relatively complex and introduce certain undesirable operational characteristics. One undesirable characteristic is caused by the phase lag introduced by the filtering action in the production of the D.C. signal, which lag must also be compensated for in the compensating arrangement. The adverse effects are increased in the presence of ripple which requires more filter action and hence more compensation. Also, certain prior art arrangements which provide servo lead without prior demodulation introduce problems of carrier phase shift and amplitude variations resulting from carrier frequency changes.

It is an object of this invention to provide an improved data sampling circuit which minimizes the servo lag introduced thereby and provides a signal, the modulation envelope of which may be readily modified in accordance with servo lead techniques.

It is a further object of this invention to provide an improved data sampling circuit which is uncomplex in form and which eliminates problems of carrier phase shift and minimizes servo lag therethrough.

It is yet another object of this invention to provide an improved data sampling circuit in which the output is phase locked with the reference signal and is obtained without appreciable time delay, and in which the frequency of the output is determined by the reference signal.

In accordance with one form of the invention, a data sampling circuit suitable for use in servo systems of the type utilizing a modulated carrier input signal is provided. A diode switching circuit is utilized to charge a capacitor in accordance with the amplitude of the carrier signal. The diode switching circuit includes a switching signal, the frequency of which is the same as the carrier frequency and the wave form of which is preferably a square wave. The switching circuit is connected such that the diodes are directly between the input signal and the capacitor without any series resistor in order to minimize the phase lag introduced thereby. A second diode circuit modulates the voltage developed across the charging capacitor in accordance with a reference signal having the same frequency as the carrier signal.

In the preferred embodiment, the phase difference between the reference and carrier signals is determined by the relationship $$\theta = \frac{\pi}{2} - \tan^{-1} \omega RC$$

where R is the resistance across the switching circuit with with the diodes conducting and C is the capacity of the charging capacitor.

For a better understanding of this invention, reference may be had to the following description taken in connection with the accompanying drawings, in which:

FIG. 2 shows wave forms obtainable at particular locations of the circuit of FIG. 1 and useful in explaining the operation thereof;

FIGS. 2 and 4 show wave forms obtainable without a filter capacitor across the output of the circuits of FIGS. 1 and 3.

Figure 1:
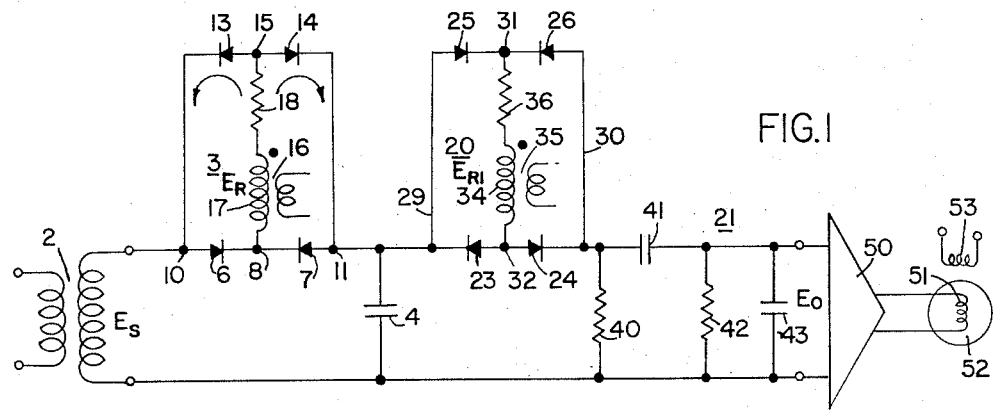
FIG. 1 is a schematic representation of a circuit embodying the invention.

Referring to FIG. 1, the input signal $E_S$ is applied through coupling transformer 2 and the demodulating switching circuit shown generally as 3 to the charging capacitor 4. The switching circuit 3 includes a pair of "back-to-back" diodes 6 and 7, that is, with like diode elements connected together at a common point 8. The other elements of diodes 6 and 7 are connected between point 10, one end of the secondary winding of transformer 2, and point 11, one side of capacitor 4. The other end of the secondary winding of transformer 2 is connected directly to the other side of capacitor 4. Diodes 13 and 14 are connected back-to-back at common point 15 and are poled and connected such that unlike diode elements of diodes 6 and 13, and 7 and 14, respectively, are connected together at 10 and 11. The reference or switching voltage $E_R$ is fed through transformer 16, the secondary 17 of which is connected in series with resistor 18 between common points 8 and 15.

The charging capacitor 4 is connected through the modulating switching circuit indicated generally as 20 to the A.C. compensation circuit indicated generally at 21.

The modulation circuit 20 is quite similar in form to the demodulating circuit 3 and includes a pair of back-to-back diodes 23 and 24 connected between the capacitor 4 and the compensation circuit 21 and shunted by back-to-back diodes 25 and 26, with unlike diode elements of diodes 23 and 25, and 24 and 26, respectively, connected together at points 29 and 30. The reference voltage $E_{R1}$ is introduced through the secondary 34 of transformer 35 in series with resistor 36 and between the common points 31 and 32 which are respectively the junctions between diodes 23 and 24, and 25 and 26.

The relative polarity of the secondaries of transformers 16 and 35 are indicated by dots in FIG. 1. The A.C. compensation circuit 21 provides a servo phase lead to compensate for the phase lag introduced by the servo motor, load inertia, and other circuit parameters of the servo system and includes an input resistor 40 shunted by the series connection of capacitor 41 and resistor 42. The output is taken across resistor 42 which may, if desired, be shunted by filter capacitor 43.

The output signal $E_O$ may be connected through an amplifier 50 to one winding 51 of the two phase servo motor 52. The other winding 53 of the servo motor 52 is energized by a signal in quadrature to that provided to winding 51.

The input signal $E_S$ comprises a modulated alternating signal which may be, for example, a sinusoidal carrier frequency of 400 cycles, the amplitude of which is modulated in accordance with the control information. The switching signal $E_R$ is the same frequency as the carrier and differs in phase from the carrier with a theoretical value of 90°. However, for optimum operation and maximum output with practical circuit parameters the phase difference will be somewhat less than 90° as discussed in detail below.

In FIG. 2, the switching voltage $E_R$ is shown 90° behind the phase of $E_S$ with both signals being shown as sine waves. During the positive alternation of $E_R$ when point 15 is positive relative to point 8, current will flow through the circuits comprising diodes 13 and 6, and 14 and 7, respectively, in series with transformer secondary 17 and resistor 8 in the direction shown by the arrows. The net effect is to permit charging of capacitor 4 from the signal source during such positive alternations of $E_R$ and the voltage across the capacitor 4, $E_{C4}$, substantially follows the input signal $E_S$ with no appreciable time lag introduced. The time lag is substantially eliminated because there are no series resistances connected between $E_S$ and the capacitor except for the diodes 6 and 7 in parallel with diodes 13 and 14. The magnitude of capacitor 4 and the signal source impedance may be maintained sufficiently small that for practical purposes the voltage across the capacitor will instantaneously follow the signal voltage without introducing any appreciable time lag into the system which time lag must later be compensated for. During the negative alternation of the switching voltage $E_R$ the voltage across capacitor 4 is unaffected by the signal voltage $E_S$.

During the charging half cycle, the voltage across the capacitor 4, for a negligible signal source impedance, is indicated by the following relationship:

(1)
$$E_{C4} = Ae^{-\frac{t}{R_1 C}} + \frac{E_S}{\sqrt{1+\omega^2 R_1^2 C^2}} \sin(\omega t + \theta - \tan^{-1} \omega R_1 C)$$

If we let:

$E_{C4} = E_{CO}$ at $\omega t = 0$
$E_{C4} = E_{CF}$ at $\omega t = \pi$ (2)
$$E_{C4}\Big]_0^\pi = \left[\frac{E_{CO} + E_{CF}}{1 + e^{-\frac{\pi}{\omega R_1 C}}}\right] e^{-\frac{t}{R_1 C}} + \frac{E_S}{\sqrt{1+\omega^2 R_1^2 C^2}} \sin(\omega t + \theta - \tan^{-1} \omega R_1 C)$$

where:

$R_1$ is the resistance across points 10 and 11 with the diodes conducting.

By inspection and interpretation of the above relationship for maximum $E_{C4}$, or optimum operation of the circuit with $R_1$ small, the signal voltage $E_S$ should be substantially in quadrature with the switching voltage $E_R$ and the circuit will reject in-phase components of the signal voltage. Also, the response to transients will be instantaneous if $R_1$ is zero. $R_1$ is minimized in that there are no resistors in series between the signal source and the capacitor 4. In order to realize maximum output across the capacitor the resistance $R_1$ appearing across the switching circuit 3 should be considered, and the angle $\theta$ between the switching voltage $E_R$ and the signal voltage $E_S$ should bear the following relationship:

(3) $$\theta = \frac{\pi}{2} - \tan^{-1} \omega R_1 C$$

While the above relationship provides maximum output across the capacitor 4, the relationship of FIG. 2 in which $\theta = 90°$ will be utilized for the explanation of the operation of the remainder of the circuit of FIG. 1. It should be appreciated that while sine wave signal and reference sources are shown in FIG. 2 the circuit is suitable for other alternating wave shapes such as square waves. Square waves are preferable to sine waves as reference signals in the diode circuits 3 and 20 in order to insure positive commutation action. If sine waves are used as reference signals they should be of relatively large amplitude to provide a relatively large change of voltage with a change of time in the region of zero voltage.

The operation of the modulation circuit 20 is similar to that described above for the switching circuit 3. The input signal is the voltage appearing across capacitor 4 and the reference voltage $E_{R1}$ is in phase with $E_R$ and may conveniently be provided by separate secondary windings of a single transformer. Alternatively, the phase of $E_{R1}$ may be reversed and the diodes 23, 24, 25 and 26 may all be reversed so as to be poled the same as corresponding diodes in the switching circuit 3. The signal which appears across the input resistor 40 of the compensation circuit 21 is shown in FIG. 2 as $E_{R40}$ while the signal which appears across capacitor 41 is shown as $E_{C41}$. The output signal $E_O$ is seen to be in phase with the switching voltage $E_R$ and to have a servo phase lead, that is, when the signal voltage increases as indicated by the fact that $E_S$ rises from a zero value at time equals zero, the output voltage has a relatively large initial amplitude to provide the desired lead characteristics and then eventually decays to a steady state value determined by the steady state amplitude of the input signal $E_S$.

Figure 3:
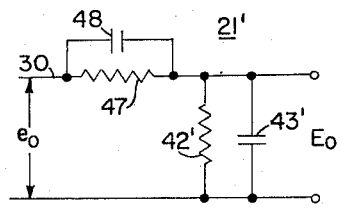
FIG. 3 is an alternate embodiment of a portion of the circuit shown in FIG. 1.

An alternate circuit arrangement suitable for use as a compensation circuit is shown in FIG. 3. Referring to that figure, it will be seen that the compensation circuit 21' includes a series resistor 27 shunted by a capacitor 48 in place of the input resistor 40 and capacitor 41 of FIG. 1. The circuit also includes an output resistor 42' and may include shunt capacitor 43' for filter purposes.

Figure 4:
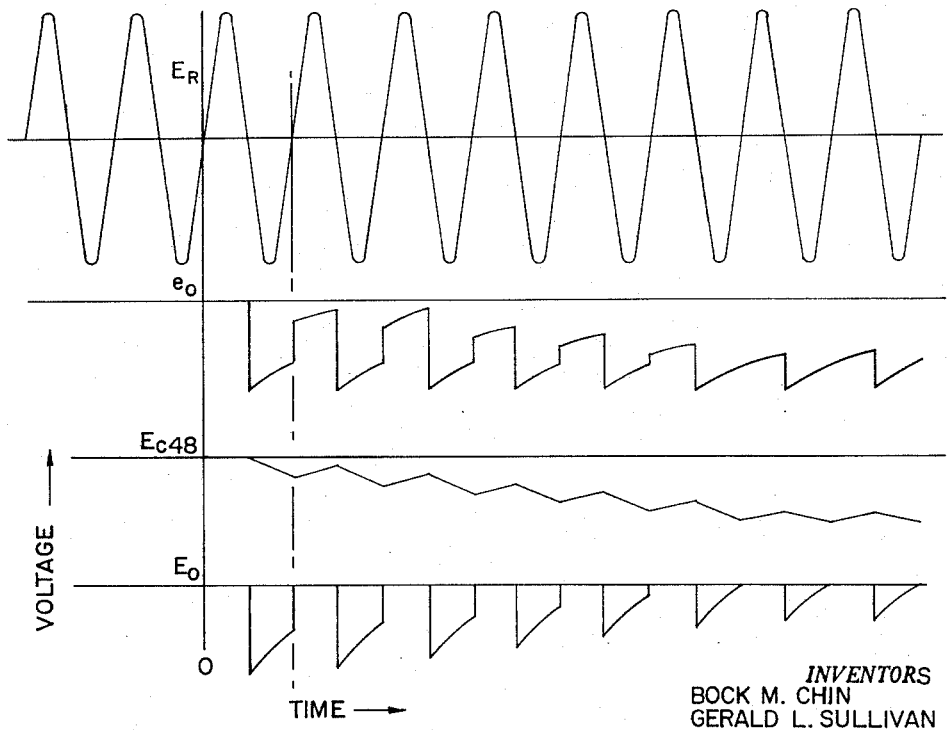
FIG. 4 shows wave forms obtaining at particular locations of the circuit of FIG. 3 and useful in explaining the operation thereof.

The signal wave forms appearing at the input of the compensation circuit across capacitor 48, and the output voltage realized with use of the circuit of FIG. 3 is shown in FIG. 4 as $e_O$, $E_{C48}$, and $E_O$, respectively. It is to be noted that these wave forms are similar to those of FIG. 2 with the principal exception that the output voltage $E_O$ has a steady-state D.-C. component.

It is to be noted that in the operation of the circuits of the subject invention there is substantially no phase lag introduced in the charging of capacitor 4 and the servo phase lead introduced by the compensation networks 21 and 21' need not compensate for such errors. Furthermore, the circuits provide a servo phase lead and develop a modulated output having a carrier which is phase locked with the switching voltage $E_R$. Also, the magnitude of the modulated carrier output signal $E_O$ is implicitly related to the magnitude of the modulated D.-C. output. Therefore, any compensation arrangement utilized will change the amplitude of the modulated A.-C. envelope in an identical fashion to the change produced in the modulated D.-C. envelope, and will not cause phase shift of the carrier.

Therefore, while particular embodiments of the subject invention have been shown and described herein, they are in the nature of description rather than limitation, and it will occur to those skilled in the art that various changes, modifications and combinations may be made within the province of the appended claims without departing either in spirit or scope from this invention in its broader aspects.

What we claim as new and desire to secure by Letters Patent of the United States is:

1. In a data sampling circuit suitable for use in servo systems utilizing a modulated carrier input signal, a charging capacitor, a diode switching circuit including a switching signal to charge the capacitor in accordance with the amplitude of the carrier signal, the frequency of said switching signal being the same as the frequency of said carrier and the phase difference therebetween being substantially determined by the relationship:

$$\theta = \frac{\pi}{2} - \tan^{-1} \omega RC$$

where: R is the resistance of said diode switching circuit and C is the capacity of said capacitor, said switching circuit connected such that there is no resistor in series with the diodes connected between the input signal and said capacitor to minimize the phase lag introduced thereby, and a second diode circuit to modulate the voltage developed across said capacitor in accordance with a reference signal having the same frequency as said switching signal.

2. In a data sampling circuit suitable for use in servo systems utilizing a modulated carrier input signal, a charging capacitor, a diode switching circuit including a switching signal to charge the capacitor in accordance with the amplitude of the carrier signal, the frequency of said switching signal being the same as the frequency of said carrier and the phase difference therebetween being substantially determined by the relationship:

$$\theta = \frac{\pi}{2} - \tan^{-1} \omega RC$$

where: R is the resistance of said diode switching circuit and C is the capacity of said capacitor, said switching circuit connected such that there is no resistor in series with the diodes connected between the input signal and said capacitor to minimize the phase lag introduced thereby, a second diode circuit to modulate the voltage developed across said capacitor in accordance with a reference signal having the same frequency as the frequency of said switching signal, and a compensation circuit to provide a servo phase lead to said modulated signal to compensate for phase lag introduced by the composite servo system.

3. In a data sampling circuit suitable for use in servo systems utilizing a modulated alternating carrier input signal, a charging capacitor, a diode switching circuit including a switching signal to charge the capacitor in accordance with the amplitude of the carrier signal, the frequency of said switching signal being the same as the frequency of said carrier and the phase difference therebetween being substantially determined by the relationship:

$$\theta = \frac{\pi}{2} - \tan^{-1} \omega RC$$

where: R is the resistance of said diode switching circuit and C is the capacity of said capacitor, said switching circuit connected such that there is no resistor in series with the diodes connected between the input signal and said capacitor to minimize the phase lag introduced thereby, a second diode circuit to modulate the voltage developed across said capacitor in accordance with a reference signal having the same frequency as said switching signal, and a compensation circuit to provide a servo phase lead to said modulated signal to compensate for phase lag introduced by the composite servo system, said switching circuit comprising said switching signal connected between a first pair of junctions formed between two pairs of diodes, each of said pairs of diodes being connected in series with unlike elements connected together forming a second pair of junctions therebetween, the said pairs of diodes being poled such that like elements are connected together at said first junctions, and said second junctions being connected directly between said signal source and said capacitor.

4. The circuit of claim 3 wherein said compensation circuit comprises a first resistor shunted by a capacitor in series with a second resistor, the output signal being provided across said second resistor.

5. The circuit of claim 3 wherein said compensation circuit comprises a first resistor shunted by a capacitor in series with a second resistor, the output signal being provided across said second resistor.

6. In a data sampling circuit suitable for use in servo systems utilizing a modulated carrier input signal, a charging capacitor, a diode switching circuit including a switching signal to charge the capacitor in accordance with the amplitude of the carrier signal, the frequency of said switching signal being the same as the frequency of said carrier and the phase difference therebetween being substantially determined by the relationship:

$$\theta = \frac{\pi}{2} - \tan^{-1} \omega RC$$

where: R is the resistance of said diode switching circuit and C is the capacity of said capacitor, said switching circuit connected such that there is no resistor in series with the diodes connected between the input signal and said capacitor to minimize the phase lag introduced thereby, a second diode circuit to modulate the voltage developed across said capacitor in accordance with a square wave reference signal having the same frequency and phase as said switching signal, and a compensation circuit to provide a servo phase lead to said modulated signal to compensate for phase lag introduced by the composite servo system, said switching circuit comprising said switching signal connected between a first pair of junctions formed between two pairs of diodes, each of said pairs of diodes being connected in series with unlike elements connected together forming a second pair of junctions therebetween, the said pairs of diodes being poled such that like elements are connected together at said first junctions, and said second junctions being connected directly between said signal source and said capacitor, said second diode circuit being the same as said diode switching circuit with the polarity of the diodes reversed and the circuit connected between said capacitor and said compensation circuit.

7. The circuit of claim 6 wherein said polarity of said diodes of said second diode circuit being the same as said diode switching circuit and the phase difference between said switching and reference signals being 180°.

8. In a data sampling circuit suitable for use in servo systems utilizing a modulated carrier input signal, a charging capacitor, a diode switching circuit including a switching signal to charge the capacitor in accordance with the amplitude of the carrier signal, the frequency of said switching signal having the same frequency as said carrier, said switching circuit connected such that there is no resistor in series with the diodes connected between the input signal and said capacitor to minimize the phase lag introduced thereby, a second diode circuit to modulate the voltage developed across said capacitor in accordance with a reference signal having the same frequency as said switching signal, and a compensation circuit to provide a servo phase lead to said modulated signal to compensate for phase lag introduced by the composite servo system, said switching circuit comprising said switching signal connected between a first pair of junctions formed between two pairs of diodes, each of said pairs of diodes being connected in series with unlike elements connected together forming a second pair of junctions therebetween, the said pairs of diodes being poled such that like elements are connected together at said first junctions, and said second junctions being connected directly between said signal source and said capacitor.

9. In a data sampling circuit suitable for use in servo systems utilizing a modulated carrier input signal, a charging capacitor, a diode switching circuit including a switching signal to charge the capacitor in accordance with the amplitude of the carrier signal, the frequency of said switching signal being the same as the frequency of said carrier, said switching circuit connected such that there is no resistor in series with the diodes connected between the input signal and said capacitor to minimize the phase lag introduced thereby, a second diode circuit to modulate the voltage developed across said capacitor in accordance with a reference signal having the same frequency and phase as said switching signal, and a compensation circuit to provide a servo phase lead to said modulated signal to compensate for phase lag introduced by the composite servo system, said switching circuit comprising said switching signal connected between a first pair of junctions formed between two pairs of diodes, each of said pairs of diodes being connected in series with unlike elements connected together forming a second pair of junctions therebetween, the said pairs of diodes being poled such that like elements are connected together at said first junctions, and said second junctions being connected directly between said signal source and said capacitor, said second diode circuit being the same as said diode switching circuit with the polarity of the diodes reversed and the circuit connected between said capacitor and said compensation circuit.

10. The circuit of claim 9 wherein the polarity of the diodes of said second diode and switching circuits are the same and the phase difference between said reference and switching signals being 180°.

11. In a data sampling circuit suitable for use in servo systems utilizing a modulated carrier input signal, a charging capacitor, a diode switching circuit including a switching signal to charge the capacitor in accordance with the amplitude of the carrier signal, the frequency of said switching signal being the same as the frequency of said carrier and the phase difference therebetween being substantially determined by the relationship:

$$\theta = \frac{\pi}{2} - \tan^{-1} \omega RC$$

where: R is the resistance of said diode switching circuit and C is the capacity of said capacitor, said switching circuit connected such that there is a minimum of resistance in series with the diodes connected between the input signal and said capacitor to minimize the phase lag introduced thereby, and a second diode circuit to modulate the voltage developed across said capacitor in accordance with a reference signal having the same frequency as the frequency of said switching signal.

12. In a data sampling circuit suitable for use in servo systems utilizing a modulated carrier input signal, a charging capacitor, a diode switching circuit including a switching signal to charge the capacitor in accordance with the amplitude of the carrier signal, the frequency of said switching signal being the same as said carrier and the phase difference therebetween being substantially determined by the relationship:

$$\theta = \frac{\pi}{2} - \tan^{-1} \omega RC$$

where: R is the resistance of said diode switching circuit and C is the capacity of said capacitor, said switching circuit connected such that there is a minimum of resistance in series with the diodes connected between the input signal and said capacitor to minimize the phase lag introduced thereby, a second diode circuit to modulate the voltage developed across said capacitor in accordance with a reference signal having the same frequency as the frequency of said switching signal, and a compensation circuit to provide a servo phase lead to said modulated signal to compensate for phase lag introduced by the composite servo system.

References Cited in the file of this patent
UNITED STATES PATENTS

| | | |
|---|---|---|
| 2,632,872 | Warsher | Mar. 24, 1953 |
| 2,774,928 | Johnson et al. | Dec. 18, 1956 |